(12) United States Patent
Turbant et al.

(10) Patent No.: US 6,869,365 B2
(45) Date of Patent: Mar. 22, 2005

(54) CROSS ASSEMBLY FOR DRIVE LINE JOINT AND CORRESPONDING DRIVE LINE JOINT

(75) Inventors: Joffrey Turbant, Carrieres sous Poissy (FR); Alexandre Robinaud, Antony (FR)

(73) Assignee: GKN Automotive GmbH (DE)

(*) Notice: Subject to any disclaimer, the term of this patent is extended or adjusted under 35 U.S.C. 154(b) by 0 days.

(21) Appl. No.: 10/275,349

(22) PCT Filed: Jan. 30, 2002

(86) PCT No.: PCT/FR02/00379
§ 371 (c)(1),
(2), (4) Date: Nov. 4, 2002

(87) PCT Pub. No.: WO02/070912
PCT Pub. Date: Sep. 12, 2002

(65) Prior Publication Data
US 2003/0078108 A1 Apr. 24, 2003

(30) Foreign Application Priority Data
Mar. 7, 2001 (FR) .......................................... 01 03121

(51) Int. Cl.[7] .............................................. F16D 3/205
(52) U.S. Cl. ................... 464/111; 403/DIG. 7; 464/123
(58) Field of Search ................................ 464/111, 122, 464/123, 124, 128–130, 905, 901; 403/332, 359.5, 379.6, DIG. 7; 411/517

(56) References Cited

U.S. PATENT DOCUMENTS

| 3,881,792 A | | 5/1975 | Orain |
|---|---|---|---|
| 4,184,242 A | * | 1/1980 | Petrie .......................... 148/589 |
| 4,693,698 A | * | 9/1987 | Olson, II ..................... 464/111 |
| 4,810,232 A | | 3/1989 | Farrell et al. |
| 4,995,736 A | * | 2/1991 | Haase et al. ................. 384/448 |
| 5,658,199 A | | 8/1997 | Ricks et al. |

FOREIGN PATENT DOCUMENTS

| FR | 2 795 467 A | 12/2000 |
|---|---|---|
| JP | 62 171525 | 7/1987 |

* cited by examiner

Primary Examiner—Kenn Thompson

(57) ABSTRACT

This spider assembly comprises a spider which comprises a hub intended to be connected to a shaft and from which there project several arms (3). Each arm comprises a cylindrical runway surface (12), a roller (5) mounted to rotate and slide on each arm via a ring of needles (4), and a split elastic ring (8) for retaining the ring of needles and the roller on the arm. The ring is axially fixed by snap-fitting onto the arm, the width of the split in the ring after mounting being zero or very much smaller than the diameter of the needles. The ring comprises, on its interior face (16), both a needle-retaining surface (20) that is flared towards the free end of the arm and delimits the space in which the needles run, and a roller-retaining surface (22) that is flared towards the free end of the arm. The flared roller-retaining surface is more or less in the continuation of the flared needle-retaining surface (20).

17 Claims, 2 Drawing Sheets

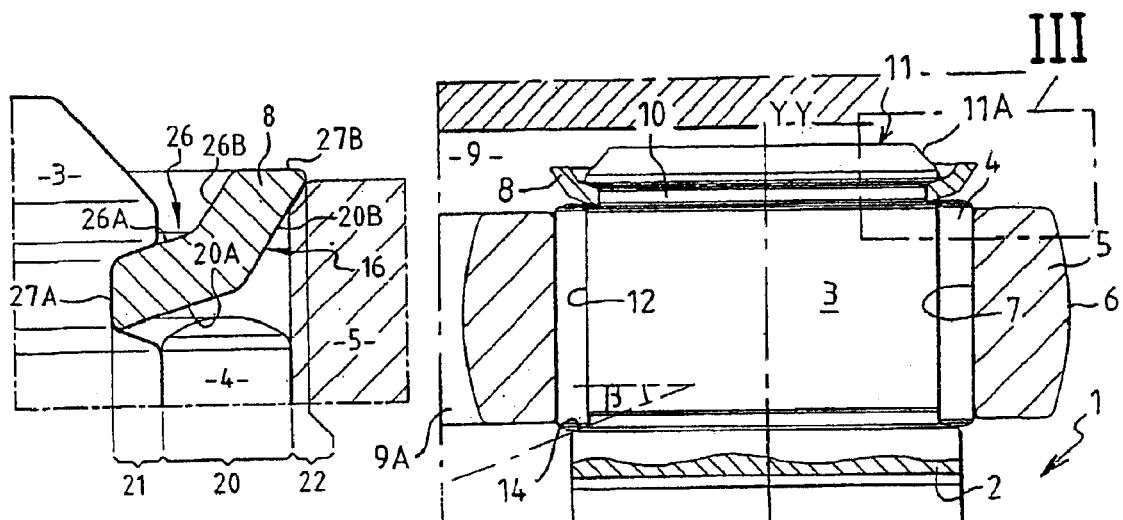
FIG.1
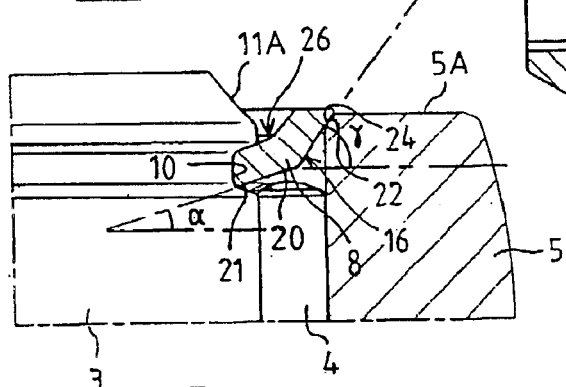
FIG.3B
FIG.3A
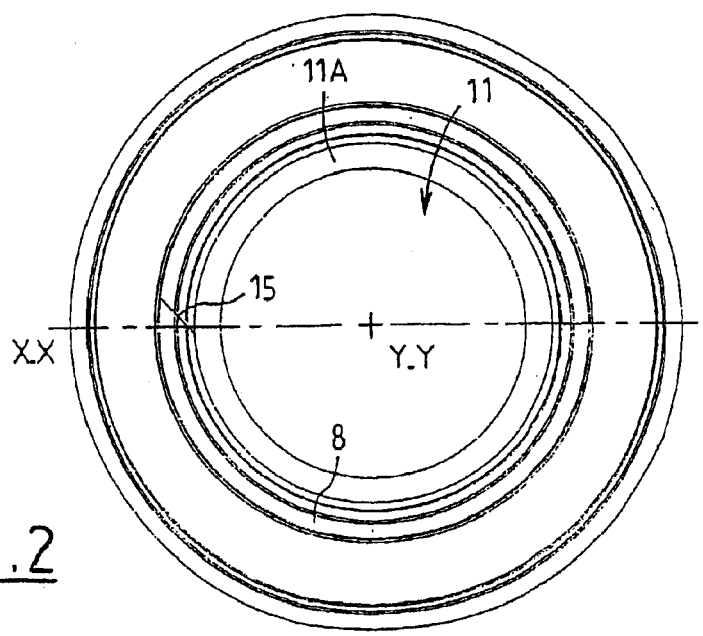
FIG.2

CROSS ASSEMBLY FOR DRIVE LINE JOINT AND CORRESPONDING DRIVE LINE JOINT

BACKGROUND OF THE INVENTION

The subject of the present invention is a spider assembly for a universal joint of the type defined in the preamble of claim 1.

The invention applies for example to constant-velocity tripod joints used in motor vehicle transmissions.

Such a spider assembly is known from French Patent FR-A-2 795 467 in the name of the Applicant Company.

The assembly described in the abovementioned document is intended to hold each roller on its arm when it is necessary for the spider equipped with rollers and needles, on the one hand, and the female element, on the other, to be delivered separately, these two parts being assembled on a vehicle assembly line. This assembly allows positive retention both of the rollers and of the needles, but the retaining ring in this assembly has, in cross section, a complex profile and this is an economic impediment to its manufacture and a technical impediment regarding tolerance bands.

SUMMARY OF THE INVENTION

It is an object of the invention to propose a suitable retaining ring for equipping the aforementioned type of spider assembly, which is of low cost while at the same time more or less maintaining the same functional advantages as those described in the aforementioned document, particularly in terms of roller and needle retention.

To this end, the subject of the invention is a spider assembly of the aforementioned type comprising the characteristics of the characterizing part of claim 1.

The spider assembly according to the invention may have one or more of the characteristics described in claims 2 to 17, taken in isolation or in any technically feasible combination.

Another subject of the invention is a universal joint comprising a spider assembly as defined hereinabove and a female element which comprises tracks in which the rollers are accommodated.

BRIEF DESCRIPTION OF THE DRAWINGS

The invention will be better understood from reading the description which will follow, given solely by way of example and made with reference to the appended drawings in which:

FIG. 1 is a view in meridian cross section of a spider assembly according to the invention;

FIG. 2 is a view from above of the spider assembly of FIG. 1;

FIG. 3A is a view on a larger scale of a detail ringed III in FIG. 1, with the roller in another position;

FIG. 3B is a view similar to FIG. 3, but on a larger scale;

DETAILED DESCRIPTION OF THE INVENTION

Figure 4:
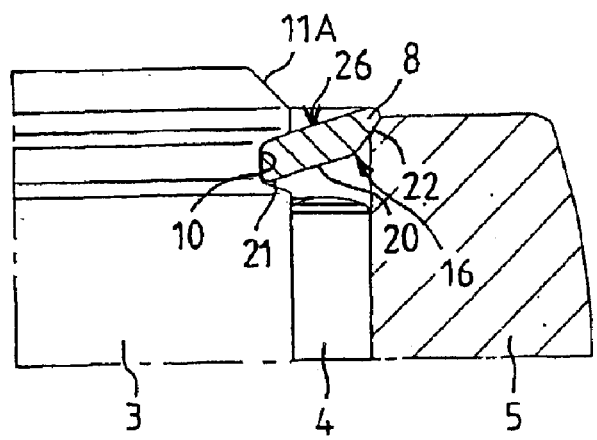
FIGS. 4 to 6 are views similar to FIG. 3A but of three alternative forms of embodiment of a spider assembly according to the invention.

FIG. 1 depicts a spider assembly of a constant velocity universal joint of the tripot type. This spider assembly comprises a spider 1 consisting of a central body or hub 2 which is annular of axis X—X assumed to be horizontal and from which there project radially three arms 3 of axis Y—Y arranged angularly 120° apart; and, on each arm 3, a ring of needles 4, a roller 5 having a spherical exterior surface 6 and a cylindrical bore 7, and a retaining ring 8.

This spider assembly is designed to equip a female element 9 merely sketched in FIG. 1, the roller 5 of each arm 3 being housed in a corresponding pair of tracks 9A that the female element comprises.

The retaining ring 8 alone provides positive axial retention of the needles 4 and also positive retention of the roller 5.

The expressions "bottom", "top", "lower" and "upper" refer, in the description which follows, to the axis X—X and to the orientation of FIGS. 1, 3A, 3B and 4 to 6, which means that "lower" denotes a position closer to this axis. Likewise, the terms "inner" and "outer" are used with respect to the axis Y—Y which means that "inner" denotes a position close to this axis Y—Y.

Each arm 3 comprises, near its free end, a circular retaining groove 10 of axis Y—Y which separates the main part of the arm 3 from an end cap 11. This cap 11 comprises a conical part 11A converging upwards. The main part of the arm comprises a cylindrical runway surface 12 of axis Y—Y which ends towards the axis X—X near a shoulder 14 of the body 2. This shoulder is chamfered so that it forms with the axis X—X an angle labelled $\beta$. At its upper end, the surface 12 is delimited by the circular groove 10.

The needles 4 are accommodated in the space formed by the runway surface 12, the shoulder 14 and the ring 8. They run both along the runway surface 12 and along the bore 7 of the roller. In consequence, in the absence of the ring 8, the roller and the needles could escape by sliding towards the outside of the arms 3 which carry them.

The ring 8 provides positive retention of the roller and of the needles on their arm before the spider assembly is mounted in the female element of the joint. For this, and as depicted in FIG. 2, the ring 8 has a vertical split 15 inclined at 45° to the radial direction, which passes through the entire cross section of the ring.

This ring 8 is a shaped annular washer, of more or less constant thickness, preferably made of a spring steel. Its inner end is snap-fitted into the retaining groove 10 of the arm, thus axially retaining the ring 8 on the arm.

As depicted in greater detail in FIGS. 3A and 3B, the lower face 16 of the ring 8, that is to say its face facing towards the hub 2, comprises:

a surface 20 for retaining the needles 4, delimiting the space in which the needles run;

a surface 21 arranged on the inside of the groove 10, situated internally with respect to the surface 20 and after the latter; and a surface 22 for retaining the roller 5, which surface is arranged plumb with the roller, situated externally with respect to the surface 20 and after the latter.

The surface 20 for retaining the needles 4 flares continuously upwards, that is to say towards the free end of the arm 3. The surface 20 comprises an inner part 20A designed to collaborate with the upper ends of the needles 4 and which is more or less frustoconical, forming with the axis X—X an angle labelled $\alpha$ measuring 18° for example.

The surface 21 is more or less frustoconical and flares upwards, meeting the surface 20 at a tangent.

The surface 22 is designed to collaborate with a mating chamfer 24 formed at the upper end of the cylindrical bore 7 of the roller 5, when this roller is in an upper end position on the arm 3, as depicted in FIGS. 3 and 3A. This surface 22 is more or less frustoconical and flares upwards, forming with the axis X—X an angle γ greater than the angle α.

The surface 22 meets an outer part 20B of the surface 20 at a tangent, this part 20B being roughly frustoconical and connected to the inner part 20A by a region the surface of which is curved.

Thus, the face 16 continuously flares along the entire width of the ring 8, the snap-fitted surface 21 and the surface 22 for retaining the roller 5 extending in the continuation of the surface 20, and meeting this surface 20 at a tangent.

The upper face 26 of the ring 8 flares continuously towards the free end of the arm. It comprises a first surface 26A more or less parallel to the inner part 20A of the surface 20 and a second surface 26B more or less parallel to the surface 22, which means that the thickness of the ring 8 is more or less constant. This ring thickness is designed so that, when the roller 5 is under maximum axial stress on the ring, this roller cannot deform the ring 8 to the extent that it leaves the groove 10 of the arm.

The ring is delimited on the inside by a cylindrical surface 27A and on the top by a flat surface 27B. In the position of FIGS. 3A and 3B, the surface 27B is more or less in the plane of the upper end face 5A of the roller, and at the level of the conical surface 11A.

In order to assemble such an arrangement, the ring of needles 4 and the roller 5 are mounted first of all, followed by the ring 8 which is fitted by deforming it elastically. The conical part 11A of the cap of the arm 3 makes the ring 8 easier to mount: it allows the ring to be opened up when it is pushed axially downwards, the edges of the split 15 then parting from one another appreciably. When the conical part 11A of the cap has been negotiated, the inner end of the ring 8 snap-fits into the groove 10, the inside diameter of the ring and the outside diameter of the groove being dimensioned such that the split 15 closes up sufficiently that the needles 4 cannot enter it during operation.

During operation, the axial forces exerted by the needles 4 on the ring 8, and possibly by the roller 5, tend to close this ring up by virtue of the flared conical shapes of the surfaces 20 and 22. The width of the split 15 is therefore small in operation.

The gradual flaring of the upper and lower faces of the ring 8 makes it possible to limit the bulk of the joint, at the free end of the arm. The ring 8 does not impede the free movement of the tripod in the female element of the joint, the needles 4 have sufficient clearance for axial translation, and the rollers 5 have sufficient freedom for axial translation, very much greater than the clearance of the needles.

The profile of the cross section of the ring 8 thus makes it possible to maintain appreciably the same functional advantages as those in the spider assembly of the aforementioned document FR-A-2 795 467, while at the same time offering great simplicity of manufacture of this ring.

Advantageously, the values of the angles α and β may be chosen to be more or less equal, so as in particular to improve the frictional behaviour of the needles 4 on the ring 8 and the hub 2.

In addition, the angle α is large enough and the axial clearance of the needles is small enough to limit the risk of the ring 8 becoming extracted during operation. In particular, the flaring of the surface 20 allows the inner end of the lower face 16 of the ring 8 to be positioned appreciably below the level of the upper ends of the needles 4 in the direction of the axis Y—Y.

Figure 5:
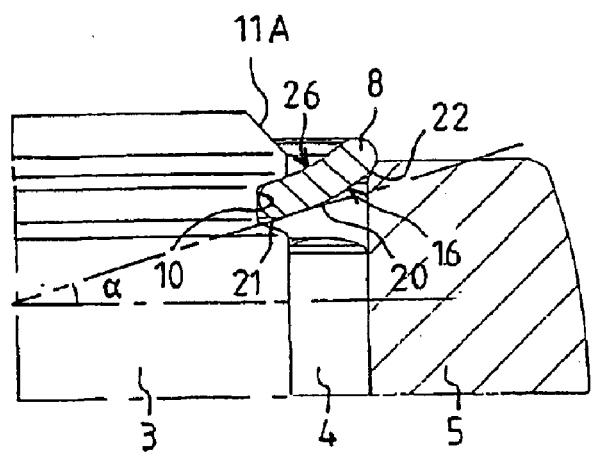
Figure 6:
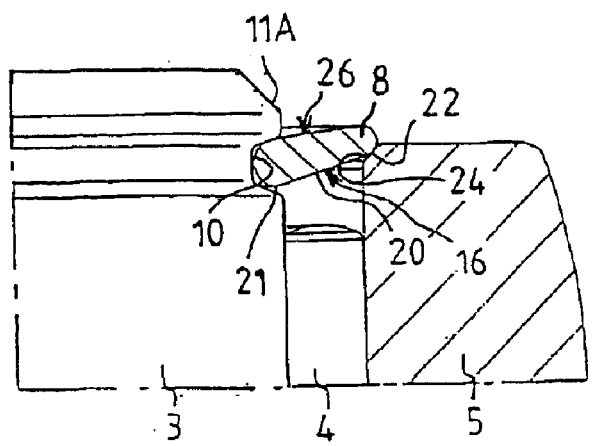

FIGS. 4 to 6 respectively depict three alternative forms of the spider assembly according to the invention. These assemblies differ from the one depicted in FIG. 3A only in the shape of the retaining ring 8. The elements which are common to all these alternative forms and to the assembly of FIG. 3A bear the same references.

In FIG. 4, the surfaces 20, 21 and 22 of the lower face 16 of the ring 8 are inclined more or less at the same angles, the part 20A of the surface 20 being wider than before. Furthermore, the upper face 26 runs roughly parallel to this part 20A across the entire width of the ring.

In FIG. 5, the lower 16 and upper 26 faces of the ring 8 are more or less spherical or toric, which means that the angle α of inclination of the needle-retaining surface 20 is therefore defined by means of the tangent to this surface 20 at the inner end of this surface. The roller 5 is retained by the surface 22, consisting of the outer end part of the lower face 16 and meeting the outer end of the surface 20 at a tangent. The surface 22 defines a contact of the sphere-plane or torus-plane type with the chamfer 24 of the roller when this roller is in its extreme upper position on the arm 3.

In FIG. 6, the lower 16 and upper 26 faces of the ring 8 run more or less in a straight line and converge towards each other in the direction of the outside. Also, the thickness of the ring 8 decreases slightly, continuously, from its inner end snap-fitted into the groove 10 towards its outer end resting against the chamfer 24 of the roller 5. The thickness of the ring 8 is dimensioned in the same way as in the embodiment of FIG. 3, that is to say such that even when the roller 5 is under maximum stress on the ring 8, the ring does not deform to the extent of leaving the groove 10 of the arm. It will be noted that, in this alternative form, the angles α of inclination of the surface 20 and γ of inclination of the surface 22 are more or less equal.

This last alternative form of the embodiment makes it possible to achieve a retaining ring profile which is particularly simple to produce and fit, while at the same time enjoying practically the same functional advantages as those described previously.

It will be noted that it is conceivable, in order to observe particular joint geometries, for the lower 16 and upper 26 faces of the ring 8 to extend such that they diverge from one another in the direction towards the free end of arm 3.

What is claimed is:

1. A spider assembly for a universal joint comprising a spider (1) which comprises a hub (2) adapted to be connected to a shaft and from which there project several arms (3), each of the arms comprising a cylindrical runway surface (12), a roller (5) mounted to rotate and slide on each arm via a ring of needles (4), and a split elastic ring (8) for retaining the ring of needles and the roller on the arm, the ring being axially fixed by snap-fitting onto the arm, the width of the split (15) in the ring after mounting being substantially smaller than a diameter one of the needle, the ring comprising, on its lower face (16), both a needle-retaining surface (20) that is flared towards a free end of the arm and delimiting a space in which the needles run, and a roller-retaining surface (22) that is flared towards the free end of the arm, wherein the flared needle-retaining surface (20) comprises an inner portion (20A) adapted to cooperate with upper ends of the needles (4), an outer portion (20B) for abutting the flared roller-retaining surface (22) at a tangent and a transition area connecting the inner and outer portions (20A, 20B), the transition area being either curved or inclined with respect to an axis (Y—Y) of the arm (3), and wherein the flared roller-retaining surface (22) is essentially in a continuation of the flared needle-retaining surface (20).

2. A spider assembly according to claim 1, wherein the lower face (16) of the ring (8) comprises, internally with respect to the flared surface (20) for retaining the needles (4), a surface (21) flared towards the free end of the arm (3), the lower face being snap-fitted onto the arm and being essentially in the inner portion (20A) of the continuation of the flared needle-retaining surface (20).

3. A spider assembly according to claim 2, wherein the flared surface (21) snap-fitted onto the arm meets the inner portion (20A) of the flared needle-retaining surface (20) at a tangent.

4. A spider assembly according to claim 3, wherein at least one of the said flared surfaces (20, 21, 22) is at least partially roughly frustoconical.

5. A spider assembly according to claim 3, wherein at least one of the flared surfaces (20, 21, 22) is at least partially approximately toric.

6. A spider assembly according to claim 1, wherein, at its interior end, the inner portion (20A) of the flared needle-retaining surface (20) forms, tangentially with a normal to an axis (Y—Y) of the arm, an angle ($\alpha$) of between approximately 5 and 20°.

7. A spider assembly according to claim 6, wherein the angle ($\alpha$) is approximately equal to 18°.

8. A spider assembly according to claim 6, wherein each arm comprises a chamfered shoulder (14) which forms a transition between the hub (2) and a corresponding runway surface (12), the chamfer of the shoulder forming, with the normal to the axis (Y—Y) of the arm, a chamfer angle ($\beta$), and wherein the angle ($\alpha$) formed by the inner portion (20A) of the needle-retaining surface (20) is approximately equal to the chamfer angle ($\beta$).

9. A spider assembly for a universal joint comprising a spider (1) which comprises a hub (2) adapted to be connected to a shaft and from which there project several arms (3), each of the arms comprising a cylindrical runway surface (12), a roller (5) mounted to rotate and slide on each arm via a ring of needles (4), and a split elastic ring (8) for retaining the ring of needles and the roller on the arm, the ring being axially fixed by snap-fitting onto the arm, the width of the split (15) in the ring after mounting being substantially smaller than a diameter one of the needle, the ring comprising, on its lower face (16), both a needle-retaining surface (20) that is flared towards a free end of the arm and delimiting a space in which the needles run, and a roller-retaining surface (22) that is flared towards the free end of the arm, wherein the flared roller-retaining surface (22) is essentially in a continuation of the flared needle-retaining surface (20), and wherein the lower face (16) of the ring (8) is situated, along an axis (Y—Y) of the arm (3), appreciably below a level defined by upper ends of the needles (4).

10. A spider assembly according to claim 1, wherein the flared roller-retaining surface (22) engages a chamfered surface (24) at an end of the bore (7) of the roller.

11. A spider assembly according to claim 10, wherein the flared roller-retaining surface (22) is shaped approximately complimentary to the chamfered surface (24) at the end of the bore (7) of the roller.

12. A spider assembly according to claim 1, wherein an upper face (26) of the ring (8) facing towards the free end of the arm (3), in the mounted state, widens towards the free end of the arm.

13. A spider assembly according to claim 1, wherein the lower (16) and upper (26) faces of the ring (8) are at least partially substantially parallel.

14. A spider assembly according to claim 1, wherein the lower (16) and upper (26) faces of the ring (8) at Least partially converge towards one another in the direction of the free end of the arm.

15. A spider assembly according to claim 1, wherein the lower (16) and upper (26) faces of the ring (8) at least partially diverge from one another in the direction of the free end of the arm.

16. A spider assembly according to claim 1, wherein the ring (8) is a shaped annular washer made of spring steel.

17. A universal joint comprising a spider assembly according to claim 1 and a female element (9) which comprises tracks (9A) in which the rollers (5) are accommodated.

* * * * *

UNITED STATES PATENT AND TRADEMARK OFFICE
CERTIFICATE OF CORRECTION

PATENT NO. : 6,869,365 B2  Page 1 of 1
APPLICATION NO. : 10/275349
DATED : March 22, 2005
INVENTOR(S) : Joffrey Turbant, Alexandre Robinaud and Christophe Crepin It is certified that error appears in the above-identified patent and that said Letters Patent is hereby corrected as shown below:

On the title page, item:
(75) Inventors, should read as follows: -- Joffrey Turbant, Carrieres sous Poissy (FR); Alexandre Robinaud, Antony (FR); Christophe Crepin, Jouy Le Moutier (FR) --

PCT Priority:
(22) PCT Filed, should read as follows: -- Jan. 31, 2002 --

Signed and Sealed this

Tenth Day of April, 2007

JON W. DUDAS
*Director of the United States Patent and Trademark Office*